United States Patent

[11] 3,550,966

[72] Inventor Heinz Leiber
 Leimen, Germany
[21] Appl. No. 778,716
[22] Filed Nov. 25, 1968
[45] Patented Dec. 29, 1970
[73] Assignee Teldix GmbH
 Heidelberg, Germany
[32] Priority Nov. 27, 1967
[33] Germany
[31] No. 1,655,460

[54] BRAKE CONTROL SYSTEM FOR PREVENTING WHEEL LOCKING
 3 Claims, 2 Drawing Figs.
[52] U.S. Cl. .................................................. 303/21,
 188/181; 303/63, 303/68
[51] Int. Cl. .................................................. B60t 8/12
[50] Field of Search ......................................... 303/6, 21,
 68—69, 61—63; 188/181

[56] References Cited
 UNITED STATES PATENTS
 2,914,359 11/1959 Yarber .......................... 188/181X
 3,066,988 12/1962 McRae ......................... 303/21UX
 3,425,751 2/1969 Wehde et al. ................. 303/21

3,467,444 9/1969 Leiber .......................... 303/21

*Primary Examiner*—Milton Buchler
*Assistant Examiner*—John J. McLaughlin, Jr.
*Attorney*—Spencer & Kaye ABSTRACT: A brake control system for preventing wheel locking suitable for use with a wheeled vehicle having brakes actuated by a fluid pressure medium. The brake control system employs a normally open inlet valve connected in the path between the brake cylinder of one or more wheels and the source of brake pressure and a normally closed outlet valve connected in the path between the brake cylinder and a pressure-free outlet. The inlet valve, when closed, inhibits the application of pressure to the brake cylinder, while the outlet valve, when open, permits the pressure already present in the brake cylinder to escape. According to the invention the outlet valve is constructed as a three-way valve having two possible valve positions. In one position it opens the path between the inlet valve and the brake cylinder and blocks the path to the pressure outlet, while in the other position it opens the path to the pressure outlet and blocks the inflow of pressure from the inlet valve.

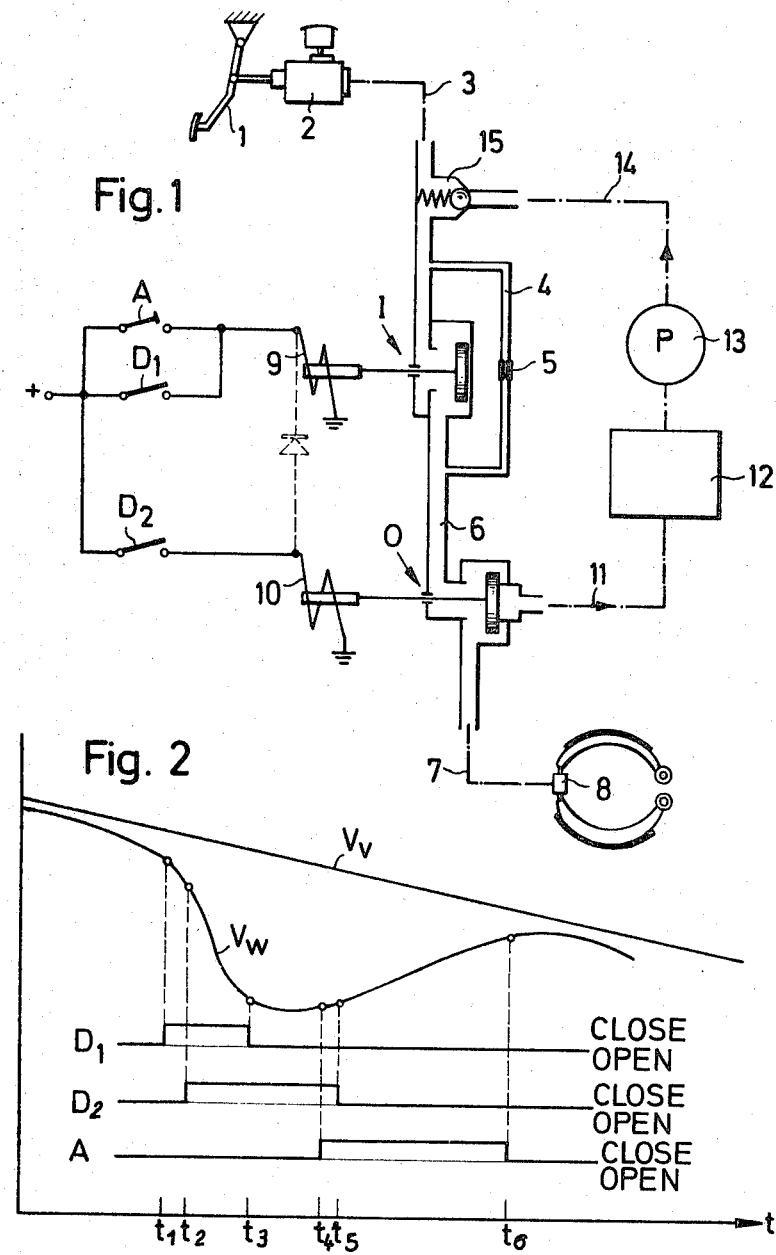

BRAKE CONTROL SYSTEM FOR PREVENTING WHEEL LOCKING

CROSS REFERENCE TO RELATED APPLICATION

The subject matter of this application is related to that disclosed in the copending application Ser. No. 771,079 filed Oct. 28, 1968, of Heinz Leiber.

BACKGROUND OF THE INVENTION

The present invention relates to hydraulic or pneumatically actuated wheeled vehicle brakes. More particularly, the present invention relates to a brake control system which may be used with brakes of this type wherein the brake pressure applied to one or more wheel brake cylinders is automatically regulated with the aid of two individually controllable valves. One of these valves—a so-called "inlet valve"—is arranged in the path of the inlet line which connects the source of brake pressure with the wheel brake cylinder. The other valve—the so-called "outlet valve"—lies in the path of a wheel brake cylinder outlet line. The term, "source of brake pressure," as used in this specification, should be understood to mean that device which is actuated by the driver of the vehicle when he applies the brakes. With simple hydraulic brake systems the source of brake pressure will be the master brake piston and cylinder; with simple brake systems having a brake pressure pump, this device will be the brake valve, etc.

Antiwheel-locking brake control systems of the type having two independently actuated valves admit of only three-valve position combinations: First, inlet valve open and outlet valve closed; second, inlet valve closed and outlet valve closed; and third, inlet valve closed and outlet valve open. With the first valve position combination the brake pressure applied to the wheel brake cylinder can rise, if the valves are maintained in these positions sufficiently long, until it equals the brake pressure delivered by the pressure source. With the second combination the pressure medium can neither flow to nor away from the wheel brake cylinder. The pressure applied at the wheel brake cylinder will therefore remain constant or, if, according to an earlier proposal, a leakage path is provided that bypasses the inlet valve, the brake pressure will slowly increase. With the third combination of valve positions the brake medium will flow out of the wheel brake cylinder causing the brake pressure there to quickly fall. Since the pressure outlet line is not connected with any source of pressure, the pressure medium can never return through the outlet valve.

The fourth possible combination of valve positions, wherein both the inlet valve and the outlet valve are open, has to be strictly avoided with a brake control system of the type described above. With piston actuated brake systems, the occurrence of this fourth position combination would allow the entire brake fluid content of the master brake cylinder to be discharged through the open outlet valve causing the brake pressure in the entire brake system to drop. Indeed, though the presence of brake pressure with this position combination is dependent upon the type of pressure source and the configuration of the brake line paths, since almost all passenger vehicles are provided with piston actuated brakes, the following rule is of general application: The reliability of vehicle brakes which are provided with an antiwheel-locking control system of the type described above is only as great as the reliability with which the fourth valve position combination can be avoided. When the brake pressure applied to each individual wheel of a vehicle is separately regulated, an error in switching a single valve can affect not only the brake pressure applied to its corresponding wheel; it can cause the entire brake system to fail.

SUMMARY OF THE INVENTION

An object of the present invention, therefore, is to increase the reliability of a brake control system for preventing wheel locking, of the type described above, having an inlet valve for controlling the flow of brake pressure to, and an outlet valve for controlling the discharge of brake pressure from, one or more wheel brake cylinders.

This object, as well as other objects which will become apparent in the discussion that follows, is achieved, according to the present invention, by constructing the outlet valve as a three-way valve having two possible valve positions and connecting it in such a way that in one position it opens a path between the inlet valve and the wheel brake cylinder and closes the path to the outlet line and, in the other position, it opens the path between the wheel brake cylinder and the outlet line and closes the path from the inlet valve.

If, with this arrangement, the inlet and outlet valves are accidentally switched into the fourth position combination, where the inlet valve is open and the outlet valve opens the path from the wheel brake cylinder to the outlet line, the three-way outlet valve will prevent the flow of brake fluid from the source of pressure to the outlet line. Although the brake pressure at the wheel brake cylinder will drop, the pressure in the inlet or main pressure line will continue to remain constant.

It will be noted that, were the inlet valve closed and the outlet valve open per the third position combination described above, the effective brake pressures present in the brake system would be exactly the same as they are with the fourth position combination; that is, the third and fourth position combinations are indistinguishable in their effect. When, as a result of any mechanical defects or electrical interference, the valves of the antiwheel-locking control system are switched to the fourth position combination instead of the third, this error will also have no effect on the pressure applied to the other wheel brakes of the system.

The present invention provides particularly important advantages when applied to the brake control system for preventing wheel locking described in the related application Ser. No. 771,079, referred to above. This brake control system employs two electromagnetically actuated valves as the inlet and outlet valves, respectively. In the absence of current, the inlet valve and the outlet valve are biased to the open and closed positions, respectively. The control current for these two valves is provided by a sensing device with a plurality of switching paths, e.g., mechanical contacts, transistors or the like) which are open and closed in dependence upon the instantaneous condition of rotation of the braked wheel.

In order to avoid the occurrence of the fourth combination of valve positions with the antiwheel-locking control system, the switching path which closes the circuit to cause the brake pressure at the wheel brake cylinder to fall is connected to simultaneously excite the windings of both the inlet and outlet valves. This is accomplished by connecting the inputs to the windings of the two valves together by means of a diode. It is therefore necessary to design the switching path, just referred to, to handle twice the current that would otherwise be necessary.

If, according to the present invention, the antiwheel-locking control system can be operated with the inlet and outlet valves in the fourth position combination, the diode in the electrical circuit can be eliminated and the current handling capacity of the above-mentioned switching path can be cut in half. This permits a considerable simplification in the construction of the electrical control.

In addition, the brake control system, described in the copending application noted above, is provided with a leakage path or constriction, which acts to shunt a limited flow of pressure fluid around the inlet valve. Even when the inlet valve is closed, this leakage path permits a small quantity of brake fluid to escape, when the outlet valve is opened to reduce the pressure in the wheel brake cylinder. If the outlet valve is constructed as a three-way valve, according to the present invention, it will, in addition to blocking the flow from the inlet valve, block the flow through this leakage path. This permits an increase in the number of brake control cycles for a given quantity of brake fluid available under pressure from a master brake cylinder and, if a pump is employed to return the discharged fluid to the main pressure line, a corresponding reduction in the size of the pump.

BRIEF DESCRIPTION OF THE DRAWINGS

FIG. 1 is an electrical and hydraulic schematic diagram of a brake control system according to a preferred embodiment of the present invention.

FIG. 2 is a speed and signal time diagram which illustrates the operation of the brake control system of FIG. 1.

DESCRIPTION OF THE PREFERRED EMBODIMENTS

Referring now to the drawing, FIG. 1 schematically illustrates the preferred embodiments of the present invention. The source of the brake pressure is shown, in FIG. 1, as a brake pedal 1 connected to actuate the piston rod of a master brake cylinder 2. This brake pressure is conveyed to the brake control system via a main pressure line 3, shown in dotted/dashed lines. The pressure is first supplied to an inlet valve I which, in its unexcited state, is normally open. A leakage bypass line 4, which contains a constriction 5, is arranged in a parallel with the inlet valve.

A connecting line 6 leads from the inlet valve to the three-way outlet valve 0, according to the invention. This outlet valve is connected via a line 7 with a wheel brake cylinder 8 and via an outlet line 11 with a storage chamber or fluid reservoir 12. When the three-way outlet valve is in its nonexcited or normal position, as shown, it connects the lines 6 and 7 and blocks the path to the line 11.

The storage chamber 12 may be viewed as providing only negligible back pressure to the line 11. As soon as it is filled to a certain level, it automatically switches on the pump 13 so that its contents are returned via the line 14 and the check valve 15 to the main pressure line 3.

The excitation windings 9 and 10 of the electromagnetically actuated inlet valve I and outlet valve 0, respectively, are selectively connected to a common voltage source marked with "+." The magnet winding 9 is connected to the voltage source via two parallel connected contacts A and $D_1$, and the magnet winding 10 is connected via a contact $D_2$. These contacts, which if necessary, can also be replaced by electronic switching circuits or individual voltage sources, are actuated in dependence upon the instantaneous conditions of motion of the wheel to be braked in such a way as to prevent the wheel from locking (i.e., skidding). The details of one such a wheel sensing device are disclosed, for example, in the copending application Ser. No. 771,079, referred to above.

The dependence of the control signals upon the conditions of rotational motion of the braked wheel are demonstrated in the time diagram of FIG. 2. FIG. 2 illustrates the circumferential speed of the wheel $V_w$ during a typical control cycle of the antiwheel-locking brake control system of FIG. 1. Above this speed characteristic is a line representing the speed of the vehicle $V_r$ which forms quite uniformly with time. The signals produced by the individual switches $D_1$, $D_2$, and A, are drawn in on individual lines below the speed curves. As is indicated at the right end of each line, the mechanical contacts illustrated in FIG. 1 are closed when a positive signal is applied to a valve winding and are open when the signal is zero. As noted above, the inlet and outlet valves of FIG. 1 are illustrated in their normal, nonexcited positions. When excitation current is applied to the winding 9 of the inlet valve, this valve will close. When excitation current is applied to the winding 10 of the outlet valve, this valve will block the path between lines 6 and 7 and connect line 7 with the outlet line 11.

The control cycle illustrated in FIG. 2 proceeds as follows: When the circumferential speed of the wheel $V_w$ begins to fall and exceeds a predetermined threshold of deceleration, the first deceleration contact $D_1$ will close, causing the inlet valve I to close. This occurs at the time $t_1$. The previously quickly rising pressure in the wheel brake cylinder 8—that is, the brake pressure—will now increase only slowly, since only a small amount of the pressure medium can flow through the constriction 5. By time $t_2$ the deceleration of the wheel has increased to a value in excess of a second threshold causing the second deceleration contact $D_2$ to close. As a result, the outlet valve 0 will allow the pressure medium in the wheel brake cylinder 8 to flow out to the storage chamber 12 through the outlet line 11. The brake pressure applied to the wheel will therefore drop and allow the wheel to "catch" again.

At time $t_3$ the rotational deceleration of the wheel (slope of the line $V_w$) has fallen below the actuation threshold of the contact $D_1$; this contact will therefore open again, allowing the inlet valve to open. This opening of the inlet valve will have no effect on the pressure at the wheel brake cylinder 8, however, since the line 6 is now blocked by the valve element of the outlet valve.

By time $t_3$ the wheel has begun to accelerate, and this acceleration has exceeded the actuation threshold of the acceleration contact A. The contact A therefore closes and causes the inlet valve to close again. When, a short time later at time $t_5$, the second deceleration contact $D_2$ again opens, the outlet valve will fall back to the position shown in FIG. 2, interrupting the reduction in brake pressure and allowing the pressure to slowly rise again as a result of the flow through the constriction 5.

At time $t_6$ the speed of the wheel will have finally reached a value close to that of the vehicle. When this occurs, the acceleration contact A and, in turn, the inlet valve I, are caused again to open. The reduced brake pressure at the wheel brake cylinder 8 will then rise quickly until either it reaches a value equal to the brake pressure in the main pressure line 3 or a new control cycle is initiated.

If, as in the brake control systems previously suggested and described, for example, in the copending application referred to above, the inlet valve is directly connected with the wheel brake cylinder 8 and outlet valve is a through-way or two-way valve of a type similar to the inlet valve, it may be easily seen that the main pressure line 3 would be connected with the outlet line 11 during the interval between times $t_3$ and $t_4$. In this case it is therefore necessary to provide a diode between the input terminals of the two valve windings 9 and 10 as illustrated in FIG. 1 in dashed lines. With the brake control system according to the present invention, this diode is no longer required, and it is no longer necessary to construct the circuit path through the deceleration contact $D_2$ to handle twice the current necessary for one winding.

In addition, it may be seen that the brake control system according to the present invention effectively prevents the flow of brake fluid through the constriction 5 whenever the winding of the outlet valve is excited. And most important, it is no longer possible, through error or otherwise, to switch the inlet and outlet valves to a position which allows the main pressure line 3 to be directly connected with the outlet line 11.

It will be understood that the above description of the present invention is susceptible to various modifications, changes and adaptations.

I claim:

1. A brake control system for preventing wheel locking suitable for use with a vehicle having brakes actuated by a fluid pressure medium, comprising in combination:
   a. fluid actuated brake means;
   b. means for supplying a fluid under pressure;
   c. first valve means having an inlet connected to said pressure supplying means and an outlet, said first valve means being operative to control the flow of fluid from said pressure supplying means; and
   d. second valve means connected to said brake means for controlling the flow of fluid to and from said brake means, said second valve means having a first position connecting said brake means to the outlet of said first valve means and disconnecting said brake means from a pressure outlet, and a second position connecting said brake means to said pressure outlet and disconnecting said brake means from the outlet of said first valve means.

2. The brake control system defined in claim 1, wherein said second valve means is a three-way valve.

3. The brake control system defined in claim 1, wherein said fluid actuated brake means includes a wheel brake cylinder.